Figure 3:
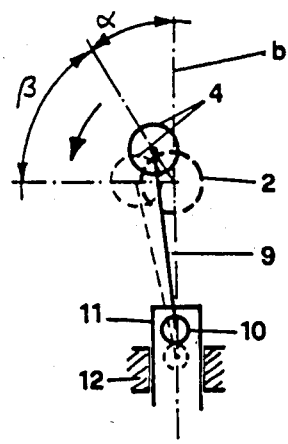

United States Patent [19]

Bregenzer

[11] Patent Number: 4,660,429

[45] Date of Patent: Apr. 28, 1987

[54] FORCE MULTIPLIER DEVICE AND METHOD OF OPERATION OF SAME

[76] Inventor: René Bregenzer, Waldparkstr. 45, CH-8212 Neuhausen/Rhf., Switzerland

[21] Appl. No.: 830,590

[22] PCT Filed: May 7, 1985

[86] PCT No.: PCT/CH85/00073

§ 371 Date: Jan. 6, 1986

§ 102(e) Date: Jan. 6, 1986

[87] PCT Pub. No.: WO85/05320

PCT Pub. Date: Dec. 5, 1985

[30] Foreign Application Priority Data

May 14, 1984 [CH] Switzerland .......................... 2359/84

[51] Int. Cl.⁴ ............................................. F16H 21/44
[52] U.S. Cl. ....................................... 74/105; 74/106; 74/600; 74/516; 74/522
[58] Field of Search ................. 74/105, 106, 600, 516, 74/522

[56] References Cited

U.S. PATENT DOCUMENTS

| | | |
|---|---|---|
| 1,480,177 | 1/1924 | Miller . |
| 2,106,945 | 2/1938 | Francis . |
| 2,629,327 | 2/1953 | Krause . |
| 2,830,455 | 4/1958 | Harmon .......................... 74/105 |
| 3,359,825 | 12/1967 | Wiig . |
| 3,530,771 | 9/1970 | Bowman . |

FOREIGN PATENT DOCUMENTS

| | | |
|---|---|---|
| 119358 | 9/1984 | European Pat. Off. . |
| 1124269 | 10/1956 | France . |
| 2473657 | 7/1981 | France . |

*Primary Examiner*—Richard J. Scanlan, Jr.
*Attorney, Agent, or Firm*—Bachman & LaPointe

[57] ABSTRACT

Wherever large forces have to be applied over short distances it is useful to employ a force multiplier device. Very large transmission ratios are, according to the present invention, obtained by interruption of the axis of rotation (2) and insertion of an only slightly displaced force transmission axis (4). The force transmission axis (4) can be continuously displaced to both sides of the axis of rotation (2) by means of positioning facilities, preferable an adjusting screw (5) or two wedges. This way variable force generation is obtained with a widely variable range of transmission ratio.

The invention can be employed e.g. for the manufacture and operation of presses, clamping, bending and tension devices.

3 Claims, 5 Drawing Figures

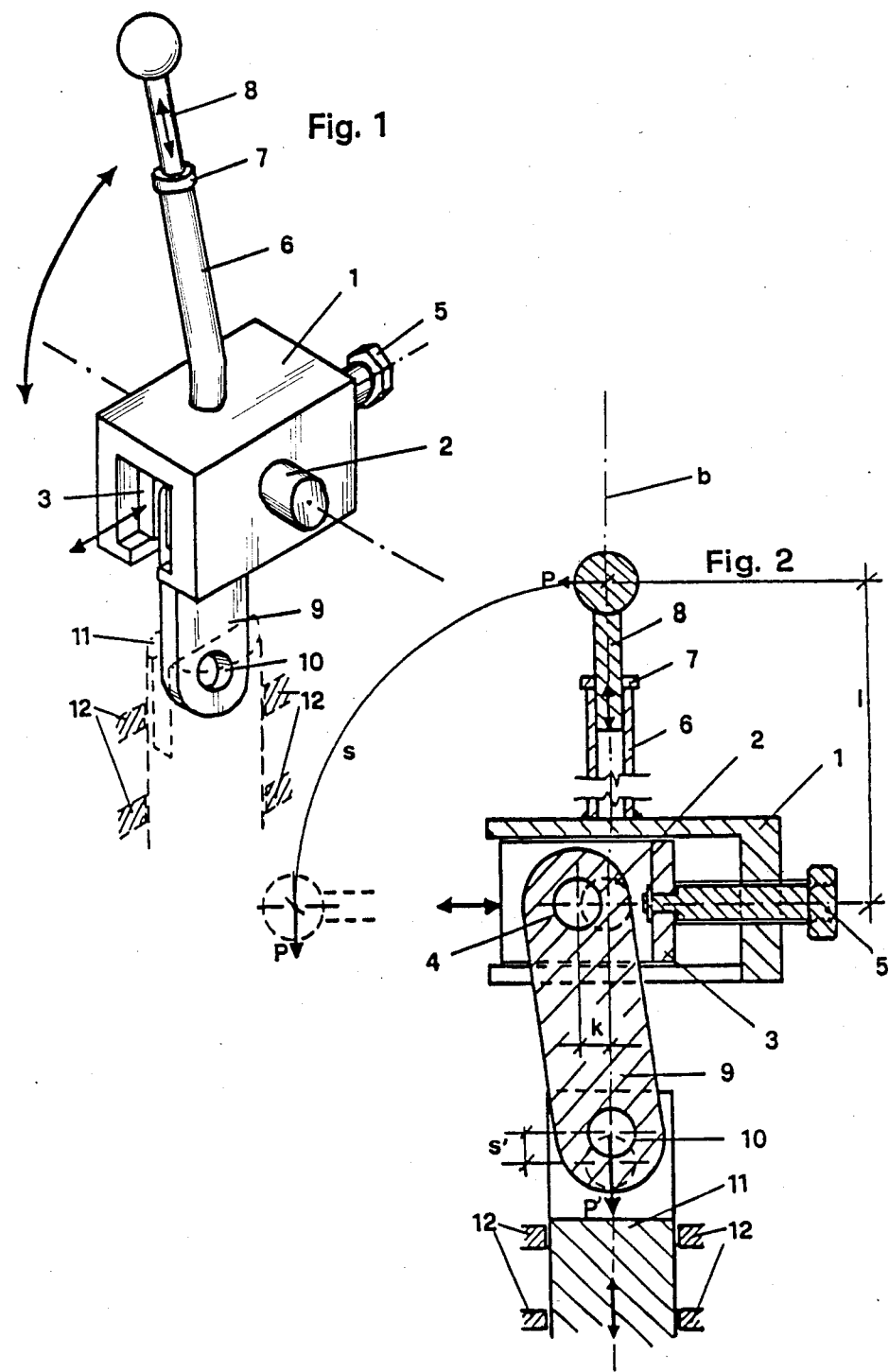

FORCE MULTIPLIER DEVICE AND METHOD OF OPERATION OF SAME

The invention relates to a device having a pivotable loading lever with a force transmission lever rigidly attached to it, an intermediate piece and a ram which is movable along its central axis for force multiplication according to the lever principle, and relates too to a method of operation of the said device.

Wherever large forces have to be applied over short distances it is useful to employ a force multiplier device. This can for example be in the form of gear transmission, rack and pinion, mechanical force transmission using the well known lever principle (load × length of loading arm = force × length of force lever), or via compressed air or hydraulic fluid and appropriate ratio of piston area to the area acted upon.

The transmission i.e. multiplication of forces according to the lever principal has for example found wide use in press manufacture, especially in toggle-lever presses. Characteristic of all of these application is the short stroke viz., few millimetres over which the force has to be applied, for example when punching out sheet metal, which calls for very high forces. This task viz., generating a large force via a small lever arm, is readily accomplished using the lever principle by means of a small load and a large loading lever.

The standard way of achieving very short force strokes in known devices is to employ a plurality of force multipliers connected in series. In more highly developed devices the stroke can be changed in a series of steps and can, therefore, be reasonably well adjusted to suit the various requirements of force and stroke.

The object of the present invention is to create a device making use of the lever principle and having a continuously variable transmission ratio by means of which device very short strokes are obtainable using only one force multiplier. A further object of the invention is to develop a method for the operation of the said device which enables compressive and/or tensile forces to be generated with lower applied load.

The object with respect to the device is achieved by way of the invention in that a hollow body with a rigidly attached loading lever features, within a free space a discontinuous axis of rotation for force multiplication, and in the region of discontinuity a U-shaped part with a force transmission axis inserted into the said free space and fixed in place there with the aid of a positioning means, the length of the force transmission lever—in the form of displacement of the axis of rotation with respect to the force transmission axis—being variable on both sides of the axis of rotation by various positioning of the U-shaped piece, and the force transmitted from the loading lever acts on the ram which features alignment means via the force transmission axis and intermediate piece.

A freely variable ratio of applied force to transmitted force leads to solutions which can be accurately suited to the problem in question and, accordingly results in the minimum requirement in energy expenditure. Force multiplication in one single step permits simple mechanical components to be employed. The hollow body and the U-shaped part are connected via an adjustable screw which brings these parts into position with respect to each other such that the desired force transmission lever of length k is formed and—according to preselected direction of rotation—a thrusting or tensile force is produced. The loading lever which is rigidly mounted to the hollow body is—according to the distance of the axis of rotation from the point of load application—of length l.

The magnitude of force multiplication is the ratio of the length of the load lever l to that of the force transmission lever k. If the rotation axis and force transmission axis are coincident i.e. on the same axis, then the lever length k=0 and no force can be generated. On the other hand the length of the force transmission lever can be very short e.g. 0.01 cm with the result that a very high transmission ratio is possible. Such high force transmission conditions are advantageous for example in clamping and pressing devices. In large devices the force transmission lever can be for example 20 cm long.

All devices according to the invention are however, usefully designed such that the angle between the line connecting the force transmission axis and the ram axis on the one hand and the longitudinal axis of the ram is at most 20°. With larger angles the component of force lateral to the longitudinal axis of the ram has a disadvantageous effect.

If the loading arm is designed as a lever, it can be fitted with an extendable part which allows the overall length l of the loading arm to be varied over wide limits. Consequently both the length k of the transmission lever and the length l of the loading arm are freely variable and adjusted according to the problem to be solved. The loading arm can also be designed as a wheel or segment of a wheel on which known mechanical means can engage.

Using adjustable facilities, in particular at least one stop, the initial and/or final position of the loading arm can be set at a desired position.

The application of a load to the loading arm is made by known, conventional means via organic, hydraulic, pneumatic or electrically powered means. The loading arm can in particular be moved rotationally by human forces as very large transmission ratios can be selected.

The device according to the invention is designed such that it can be positioned with respect to the distance from the workpiece. This takes place for example via an adjusting screw or by means of an elevating spindle.

A first method of operating the device is such that the force transmission axis at the start of its rotational movement about the axis of rotation is in the region furthest removed from the longitudinal axis of the ram and, at the end of its rotational movement, lies in the region of the longitudinal axis of the ram, as a result of which an increasing force is developed. The force developed in the longitudinal direction of the ram is larger the closer the force transmission axis moves to the longitudinal axis of the ram. Such a development of force can be desirable e.g. when rivetting or bending.

A further method of operating the device is such that the force transmission axis, at the start of its rotational movement around the axis of rotation, is situated in the region of the longitudinal axis of the ram and, at the end of its rotational movement, is situated in the region furthest removed from the longitudinal axis of the ram as a result of which a decreasing force is developed. The development of force is therefore such that the force in the longitudinal direction of the ram decreases as the distance of the force transmission axis to the longitudinal axis of the ram increases. Such a development of force can be desirable for example for punching tools.

Finally a method of operation is characterised in that the force transmission axis is rotated in the region furthest removed from the longitudinal axis of the ram, preferably within a range of 60°–120° to this, as a result of which an essentially constant force is developed. The force acting on the workpiece via the ram is altered only insignificantly on uniform loading of the loading arm, as the force transmission axis is not moved into the vicinity of the longitudinal axis of the ram. This can be advantageous for example in clamping devices.

Depending on the direction of load application to the loading arm, for a given length k of loading arm, the ram performs a movement in the direction of the axis of rotation (tension motion) or away from the axis of rotation (compressive motion).

The device according to the invention and methods for its operation are suitable for various uses and/or applications:

pressing devices e.g. punching, stamping, bending, rivetting, deep drawing
clamping devices
bending devices
tension devices The machines equipped with the device according to the invention are fitted with the usual facilities—not described in detail here—such as for example return springs, clamping-down devices, facilities for feeding and removing the workpiece and of course a frame.

These machines can be newly built or existing machines can be converted.

By unrestricted adjustment of the loading and force transmission arms optimal ratios for force multiplication can be reached within a wide range of possibilities —in practice between 10 and 10,000; on the other hand unnecessarily large stroke can be avoided.

EXAMPLE 1

The axis of rotation of a force multiplication unit of a 5000 N press was interrupted, the force transmission axis of a force transmission lever which is mounted on a U-shaped part inserted in the space created, and fixed in place by an adjusting screw. This enabled a small eccentricity to be obtained between the axis of rotation and the force transmission axis, which distance being the force lever. The loading lever of the press is 30 cm long, the force transmission lever after conversion variable between 3 and 0.3 cm, as a result of which a transmission ratio of 10–100 is obtained. Trials showed that in order to punch an oblong hole in 1.5 mm aluminium sheet a press force of 4,500 N is required. With the converted press at a transmission ratio of 100 a load of 45 N is therefore required; this can be applied manually without problem.

EXAMPLE 2

In another press with interrupted axis of rotation of force multiplication and inserted force transmission axis according to the invention the loading arm was variable between 40 and 90 cm. With fully extended loading arm and force transmission lever set at 4.5 mm a transmission ratio of 200 was obtained. It has been shown that stamping a depression in steel requires a press force of 60,000 N. This required a load of approx. 300 N which could just still be applied by hand.

The invention is explained in greater detail with the aid of examples shown schematically in the drawings viz., FIG. 1 A perspective view of a device according to the invention for force multiplication.

FIG. 2 A vertical cross-section through the device shown in FIG. 1 and

Figure 4:
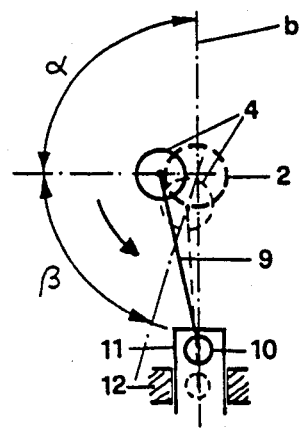
Figure 5:
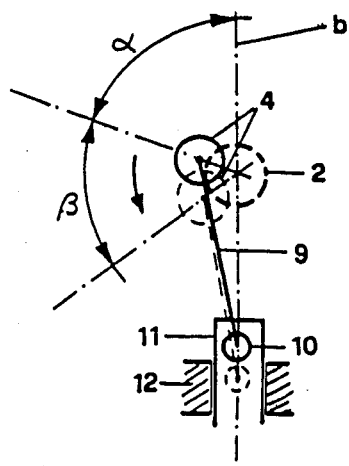

FIGS. 3–5 Variously designed ranges of rotation of the loading arm.

A device for force multiplication with continuously variable ratio comprises, as shown in FIGS. 1 and 2, a hollow body 1 and interrupted axis of rotation 2 for force multiplication. Inserted in the region of the interrupted axis of rotation is a U-shaped part 3 which contains the force transmission axis 4 and is fixed by means of a positioning facility, here an adjusting screw 5. Also suitable as positioning means, however, are e.g. two wedges, not shown here. The force transmission lever of length k is formed between the interrupted axis of rotation 2 and the force transmission axis 4. The loading lever 6 is rigidly attached to the hollow body 1 and contains an extendable extension piece 8, both parts being fixed together by means of a setting ring 7. The transmission ratio ü can be calculated from the length l of the loading arm and the distance k as ü=l/k.

If a force P is applied to the loading arm then a force P' can be transferred via intermediate piece 9 to the ram axis 10. The force P' acts on ram 11 aligned by means of guides 12. The following relationship is valid here viz., $$P' \simeq P \times l/k$$

The ram axis 10 and ram 11 as a result move a distance s' along the direction of the longitudinal axis of the ram whereby $$s' \simeq s \times k/l$$

An essential advantage of the device shown in FIGS. 1 and 2 is the easy selection of transmission ratio to suit any particular problem or else minimising the force P to be applied to the loading arm for a given distance s'.

A tension movement can—as shown in FIG. 2—be obtained if the loading lever is swung beyond the horizontal position, shown here by broken lines. Also a tension movement would be obtained if the loading lever as shown in FIG. 2 would be moved clockwise or, the force transmission lever of length k were designed to lie in the direction of the adjusting screw 5 (turning action counterclockwise with respect to FIG. 2).

In FIGS. 3–5 the turning action of the loading lever during its operation, comprising positioning and the actual working movement, is indicated by β. This range of rotation β is restricted by two stops, not shown here.

The initial angle of rotation α i.e. the angle between the longitudinal axis b of the ram and the loading lever determines, for a given position of the force transmission axis, the mode of force generation.

FIG. 3 shows a turning movement β with decreasing force generation, FIG. 4 a turning movement β with increasing force generation, and FIG. 5 a turning movement β with approximately constant force generation.

What is claimed is:

1. A force transmitting device comprising a hollow body defining a chamber, said hollow body being pivotably mounted about a first axis of rotation on a pair of opposed pins; a U-shaped part mounted within said chamber and selectively movable therein; an intermediate piece having one end pivotably mounted to said U-shaped part about a second axis of rotation and the other end pivotably mounted to a ram about a third axis of rotation; means for selectively positioning said U-shaped part within said chamber between a first position wherein said second axis of rotation is on one side of said first axis of rotation and a second position wherein said second axis of rotation is on the other side of said first axis of rotation; and means for rotating said hollow body about said first axis in one direction such that said ram moves in a first direction when said U-shaped part is in said first position and said ram moves in a second direction when said U-shaped part is in said second position.

2. A device according to claim 1 wherein said means for selectively positioning said U-shaped part within said chamber varies the length between said first axis of rotation and said second axis of rotation between 0 to 20 cm.

3. A device according to claim 1 wherein said means for rotating said hollow body comprises a loading lever provided with an extendable extension piece secured to said loading lever.

* * * * *